(12) United States Patent
Telang et al.

(10) Patent No.: US 8,958,353 B2
(45) Date of Patent: Feb. 17, 2015

(54) POWER EFFICIENT UE SIDE MECHANISM FOR RECEIVING BMC MESSAGES

(71) Applicant: ST-Ericsson SA, Plan-les-Ouates (CH)

(72) Inventors: Sachin Vitthal Telang, Bangalore (IN); Anies Shaik Sulaiman, Kochi (IN)

(73) Assignee: ST-Ericsson SA, Plan-les-Ouates (CH)

( * ) Notice: Subject to any disclaimer, the term of this patent is extended or adjusted under 35 U.S.C. 154(b) by 137 days.

(21) Appl. No.: 13/782,500

(22) Filed: Mar. 1, 2013

(65) Prior Publication Data
US 2014/0247760 A1 Sep. 4, 2014

(51) Int. Cl.
G08C 17/00 (2006.01)
H04W 52/02 (2009.01)
H04W 4/06 (2009.01)

(52) U.S. Cl.
CPC ............ *H04W 52/0219* (2013.01); *H04W 4/06* (2013.01); *H04W 52/0209* (2013.01)
USPC ....................................................... 370/311

(58) Field of Classification Search
None
See application file for complete search history.

(56) References Cited

U.S. PATENT DOCUMENTS

| 8,271,627 | B2 | 9/2012 | Cho et al. | |
|---|---|---|---|---|
| 2003/0174678 | A1* | 9/2003 | Chang et al. | 370/335 |
| 2006/0094441 | A1* | 5/2006 | Beckmann et al. | 455/455 |
| 2006/0156370 | A1* | 7/2006 | Parantainen | 725/132 |
| 2008/0032722 | A1 | 2/2008 | Chiang et al. | |
| 2009/0323624 | A1* | 12/2009 | Kim | 370/329 |
| 2011/0105075 | A1 | 5/2011 | Lee et al. | |
| 2013/0308781 | A1* | 11/2013 | Kristiansson et al. | 380/270 |
| 2014/0307613 | A1* | 10/2014 | Dhanda et al. | 370/312 |

FOREIGN PATENT DOCUMENTS

EP 1392074 A2 2/2004

OTHER PUBLICATIONS

Motorola, "Introduction of Serial Number in BMC Schedule Message",3GPP Draft; R2-060703-25324R6CR028-Message-Serialnumber,3rd Generation Partnership Project (3GPP),Mobile Competence Centre; 650, Route Des Lucioles ;F-06921 Sophia-Antipolis Cedex ; France,vol. RAN WG2, No. Denver, USA; Feb. 20, 2006, XP050130638,[retrieved on Feb. 20, 2006].

Motorola: "BMC enhancement—Serial Number in BMC Schedule Message",3GPP Draft; R2-060452-25324R6CRXXXX-Message-Serialnumber,3rd Generation Partnership Project (3GPP),Mobile Competence Centre; 650, Route Des Lucioles ; F-06921 Sophia-Antipolis Cedex ; France,vol. RAN WG2, No. Denver, USA; Feb. 9, 2006, XP050130431,[retrieved on Feb. 9, 2006].

* cited by examiner

*Primary Examiner* — Otis L Thompson, Jr.
(74) *Attorney, Agent, or Firm* — Coats & Bennett, PLLC

(57) ABSTRACT

A UE side Broadcast/Multicast Control (BMC) protocol layer determines those Cell Broadcast Service (CBS) messages (and their repetitions) which the UE shall read or ignore in a succeeding CBS schedule period, based on the CBS Schedule Message contents (Message Description Type and New Message Bitmap) received in a current CBS schedule period, the CBS messages already stored in the BMC, and the CBS messages to be received. In this manner, the UE may ignore CBS messages it has already received, without knowledge of the CBS message serial numbers, and thus conserve resources such as battery power.

14 Claims, 5 Drawing Sheets

| VALUE | EXPLANATION |
|---|---|
| 0 | REPETITION OF NEW BMC MESSAGE WITHIN SCHEDULE PERIOD |
| 1 | NEW MESSAGE |
| 2 | READING ADVISED |
| 3 | READING OPTIONAL |
| 4 | REPETITION OF OLD BMC MESSAGE WITHIN SCHEDULE PERIOD |
| 5 | OLD MESSAGE (REPETITION OF A MESSAGE SENT IN A PREVIOUS SCHEDULE PERIOD) |
| 6 | SCHEDULE MESSAGE |
| 7 | CBS41 MESSAGE |
| 8 | NO MESSAGE |
| 9 ... 255 | RESERVED FOR FUTURE USE (IEs RECEIVED WITH THIS VALUE WILL BE REPLACED BY VALUE 3) |

3GPP TS 25.324 TABLE 11.9-3

*FIG. 2*
*(PRIOR ART)*

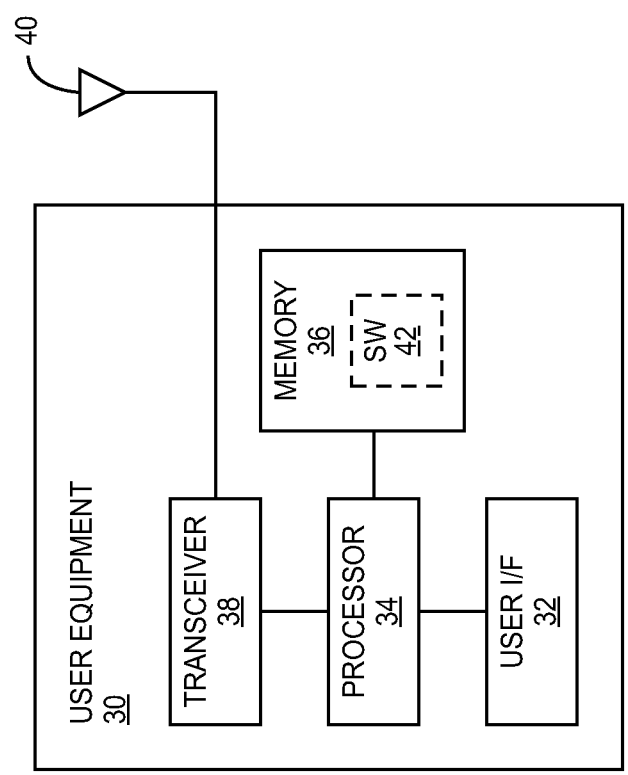

POWER EFFICIENT UE SIDE MECHANISM FOR RECEIVING BMC MESSAGES

FIELD OF INVENTION

The present invention relates generally to wireless communication networks, and in particular to a power-efficient method of receiving Broadcast/Multicast Control protocol message by User Equipment.

BACKGROUND

Modern wireless communication networks are ubiquitous in many parts of the world. With advances in technology, and sophisticated protocols and standards (e.g., 3GPP technical standards), wireless networks deliver far more services than the paging and mobile telephony for which they were originally designed. One such advanced service is the ability of a network to transmit the same information to all User Equipment (UE) within one or more cells (broadcast), or to a select group of UE (multicast). To facilitate this service, the Broadcast/Multicast Control (BMC) protocol is defined as part of the Group Radio Access Network (GRAN) in 3GPP Technical Specification 25.324, "Broadcast/Multicast Control BMC," the disclosure of which is incorporated herein by reference in its entirety.

3GPP TS 25.324 defines BMC as a sublayer in the user plane of Layer 2 of the network layer protocol stack. To place the BMC in context, FIG. 1 depicts a diagram of the relevant parts of the UTRA FDD radio interface protocol architecture 10. The BMC 12 resides in Layer 2 above the Radio Link Control (RLC) layer 14, which maps logical channels. The RLC 14 itself resides above the Media Access Control (MAC) layer 16, which maps traffic channels. Layer 1 includes the Physical (PHY) layer 18, which implements transmission and reception. Layer 3 includes the Radio Resource Control (RRC) layer 20, which provides control for the BMC 14, RLC 16, MAC 18, and PHY 20. The BMC 12 is transparent for all services other than broadcast/multicast. Note that the BMC exists only in the user plane.

On the network side, the BMC implements the Cell Broadcast Service (CBS). CBS is described herein in the context of UTMS; however it is also implemented in other air interface protocols, such as GSM. Accordingly, the description herein is illustrative only and is not limiting. Cell broadcast messages are Short Message System (SMS) text messages, although they are not encumbered by the length restriction of SMS text messages. A CBS message consists of one or more CBS pages, each comprising 82 octets. A CBS message may include up to 15 CBS pages. CBS messages are normally repeated, to increase the probability of successful reception by many UE.

All UE capable of receiving CBS messages (that are in idle, CELL_PCH, or URA_PCH RRC-states of Connected mode) may receive each CBS message. The CBS message includes a message ID that identifies the source and type of the CBS message. By inspection of the type in the message ID, individual UEs receiving a CBS message may forward the message to higher layers or discard it, depending on whether the UE is subscribed to a CBS service for that type. In this manner the BMC implements multicast, wherein only groups of subscribers receive certain message types (e.g., news, sports, weather, stock prices, and the like).

Each CBS message is delivered in a Physical Data Unit (PDU), and includes various Information Elements (IE). Each CBS message includes a Message Type IE (distinct from the type of CBS service described above). There are three types of CBS message PDUs: CBS message, CBS41 message, and schedule message. A BMS CBS message carries cell broadcast/multicast data and address information for GSM based CBS. A CBS41 message carries cell broadcast/multicast data and address information for ANSI-41. A scheduling message defines the schedule of CBS messages, including the next schedule message, in a succeeding CBS schedule period, which is defined in terms of a number of Common Traffic Channel (CTCH) block sets. Scheduling messages allow for support for UE discontinuous reception (DRX) to preserve battery life.

The CBS schedule message defines a succeeding CBS schedule period by defining an Offset to Begin CTCH BS index IE (defining the beginning of the next period) and a Length of CBS Scheduling Period IE (defining the duration of the next period). The CBS schedule message also includes a New Message Bitmap IE that identifies every CTCH BS in the next period during which a complete or partial CBS PDU will be transmitted. The CBS schedule message further includes a Message Description IE for each CBS PDU identified in the New Message Bitmap. The Message Description IE include a Message ID and Message Description Type for each CBS PDU. The encoding of the Message Description Type (MDT) field is presented in FIG. 2 (Table 11.9-3 of 3GPP TS 25.324). Note that MDT 1 and 0 identify new (and repetitions of new) CBS messages, and MDT 5 and 4 identify old (and repetitions of old) CBS messages. MDT 6 identifies the CBS schedule message of the next period.

In the next period, the UE must receive all new CBS messages; it may ignore old CBS messages that it has already received. However, prior to receiving each old CBS message, the UE knows the Message ID, but does not know the Message Serial Number, which is an IE transmitted only in CBS message PDUs (not the CBS scheduling message PDU). Thus, for old messages, the UE cannot determine whether it has previously received the message or not. Accordingly, the UE must receive the message. Upon reception, the UE may inspect the Message Serial Number IE to determine whether it has previously received the CBS message. If not, it passes the CBS message to higher layers; if the UE has previously received the CBS message, the UE may discard it. The reception, downconversion, demodulation, decoding, and other processing required to receive an old CBS message, which the UE later learns it had previously received and thus discards, severely and unnecessarily drains UE battery power.

To address this deficiency, in 3GPP Release 6, a Change Request was introduced to 3GPP TS 25.324: CR 0028, "Introduction of Serial Number in BMC Schedule Message." While this should provide Serial Number information to the UE regarding all old CBS messages in the upcoming period, discussions with network operators and inspection of extant networks reveals that the CR has not been widely implemented. Accordingly, the Rel. 6 CR is ineffective to resolve the above-described problem in real-world, deployed networks.

Accordingly, a need exists in the art for a method of reliable BMC message handling in the UE, which does not unnecessarily deplete UE battery life, in the absence of network side support for Serial Number identification.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, the UE side BMC layer determines those CBS messages (and their repetitions) which the UE shall read or ignore based on the CBS Schedule Message contents (Message Description Type and New Message Bitmap), the CBS messages already stored in the BMC, and the CBS messages to be received (as indicated in the Schedule Message).

One embodiment relates to a method of efficiently receiving BMC protocol messages by a BMC layer in User Equipment operative in a wireless communication network. A first list comprising Message IDs of CBS messages to be received during a succeeding CBS schedule period, and second list comprising Message IDs of received CBS messages, are maintained. A CBS schedule message is received. It is determined, from the CBS schedule message, all CBS messages scheduled to be broadcast in the succeeding CBS schedule period. All scheduled CBS messages indicated in the CBS schedule message as new or repetition of new are added to the first list. All scheduled CBS messages indicated as old or repetition of old that are not included in the second list are added to the first list. All scheduled CBS messages indicated as old or repetition of old that are included in the second list and for which the corresponding CTCH BS Index in the CBS schedule message is indicted as new in the New Message Bitmap IE, are added to the first list. Resources are configured to receive only the CBS messages in the first list, as well as a CBS schedule message, in the succeeding CBS schedule period.

Another embodiment relates to a UE operative in a wireless communication network. The UE includes a transceiver operative to selectively receive messages from a network node, memory, and a processor operatively connected to the memory. The processor is operative to maintain a first list comprising Message IDs of CBS messages to be received during a succeeding CBS schedule period; maintain a second list comprising Message IDs of received CBS messages; cause the transceiver to receive a CBS schedule message; determine, from the CBS schedule message, all CBS messages scheduled to be broadcast in the succeeding CBS schedule period; add to the first list, all scheduled CBS messages indicated in the CBS schedule message as new or repetition of new; add to the first list, all scheduled CBS messages indicated as old or repetition of old that are not included in the second list; add to the first list, all scheduled CBS messages indicated as old or repetition of old that are included in the second list and for which the corresponding CTCH BS Index in the CBS schedule message is indicted as new in the New Message Bitmap IE; and configure resources to receive only the CBS messages in the first list, as well as a CBS schedule message, in the succeeding CBS schedule period.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 2 is a table of Message Description Type encoding.

FIG. 5 is a functional block diagram of a UE.

DETAILED DESCRIPTION

Figure 1:
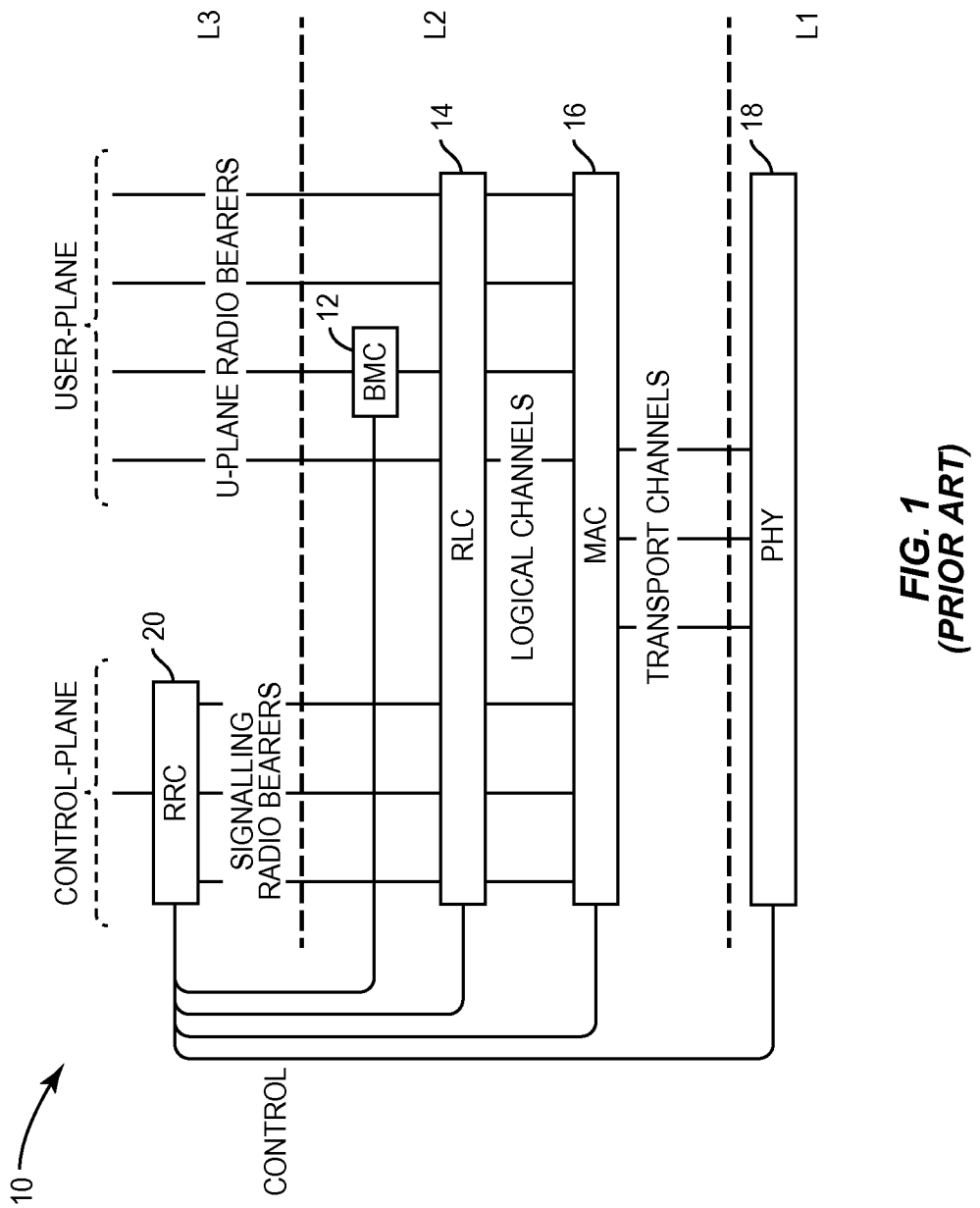
FIG. 1 is a functional block diagram of part of the network layer protocol stack in a wireless communication network node.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the UE, the BMC layer determines which CBS messages it must receive (and hence may avoid receiving those which would be redundant) in a succeeding CBS schedule period by maintaining information on CBS messages already received, and by parsing the contents of the CBS schedule message in the current CBS schedule period.

In particular, the BMC layer maintains two lists: a list of previously received CBS messages (e.g., BMC_ReceivedMessageList), and a list of messages to be received in the next CBS schedule period (e.g., BMC_MessagesToBeReceivedList). By reference to these two lists, and the information carried in the conventional CBS schedule message (without Serial Numbers), the UE BMC layer 12 can resolve which CBS messages it should receive in the succeeding schedule period, and which it can safely ignore.

Initially, the BMC 12 inspects the CBS schedule message for the current CBS schedule period. For each CBS message to be transmitted in the next schedule period, the CBS Schedule message contains the Message Description IE which specifies a Message Description Type (MDT) and a Message ID. FIG. 2 depicts the encodings of the MDT field. The New Message Bitmap IE of this CBS schedule message specifies each CTCH BS which contains a CBS Message (partly or completely) which either: was not sent during the previous schedule period; was sent unscheduled during the preceding schedule period; is the first transmission of a given BMC message in the CBS schedule period; or is a repetition of it within the CBS schedule period. The New Message Bitmap IE also specifies each CTCH BS which contains a CBS message that was transmitted in the previous schedule period.

For each new CBS message (MDT:1) or repetition of a new message (MDT:0), the BMC 12 adds the corresponding Message ID to the BMC_MessagesToBeReceivedList.

For each old CBS message (MDT:5) or repetition of an old message (MDT:4), the BMC 12 adds the corresponding Message ID to the BMC_MessagesToBeReceivedList under any of the following conditions. First, the old or repetition of old CBS message will be added to the BMC_MessagesToBeReceivedList if the Message ID is not stored in the BMC_ReceivedMessageList. Second, the old or repetition of old CBS message will be added to the BMC_MessagesToBeReceivedList if the Message ID is stored in the BMC_ReceivedMessageList, but the New Message Bitmap IE in the CBS schedule message indicates the corresponding CTCH BS Index as "new." Third, if the Message ID is stored in the BMC_ReceivedMessageList, but also has already been added to the BMC_MessagesToBeReceivedList, it remains in the BMC_MessagesToBeReceivedList and will be received in the succeeding CBS schedule period.

Figure 3:
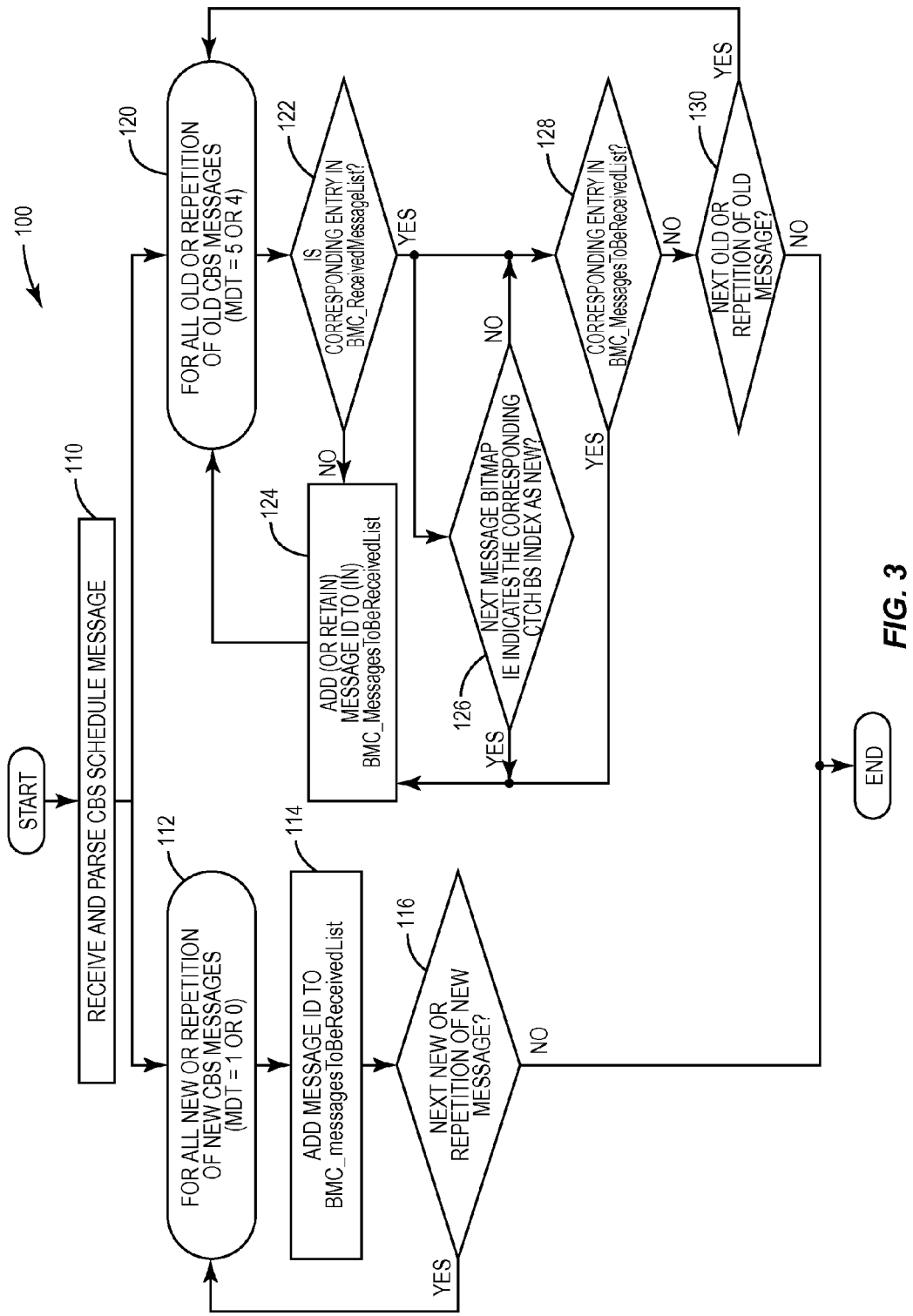
FIG. 3 is a flow chart of an efficient method of selectively receiving CBS messages.

FIG. 3 depicts a method 100 of efficiently receiving CBS messages by a BMC layer 12 in a UE. The method is repeated for each CBS schedule period, in preparation for selectively receiving CBS messages in a succeeding CBS schedule period. The CBS schedule message is received and parsed (block 110), based on the Message Description (MDT: 6) and New Message Bitmap extracted from a CBS schedule message received during the previous CBS schedule period. The BMC layer 12 then iteratively loops through all CBS messages scheduled for transmission in the succeeding CBS schedule period. Although FIG. 3 depicts this processing as two separate, parallel, iterative loops to better describe the processing occurring in each, those of skill in the art will readily recognize that separate iterations may be performed sequentially, or that the BMC layer 12 may combine the loops into a single iterative processing loop.

As depicted in FIG. 3, for all new CBS messages (MDT:1) or repetitions of new CBS messages (MDT:0) (block 112), the corresponding Message ID is added to the BMC_MessagesToBeReceivedList (block 114). This process repeats until all new or repetition of new CBS messages have been processed (block 116). This iterative process ensures that the BMC layer 14 will, during the succeeding CBS schedule period, receive all new CBS messages, or repetitions thereof, for possibly passing to higher layers, depending on the CBS message content and the CBS message types to which the UE is subscribed.

As FIG. 3 also depicts, all old CBS messages (MDT:5) or repetitions of old CBS messages (MDT:4) (block 120) are processed. If such a message is not already included in the BMC_ReceivedMessageList (block 122)—that is, the UE has not previously received the same CBS message—then the corresponding Message ID is added to the BMC_MessagesToBeReceivedList (block 124).

If the message is included in the BMC_ReceivedMessageList (block 122)—that is, the UE has previously received this CBS message—but the New Message Bitmap IE of the CBS schedule message indicates that the corresponding CTCH BS Index is new (block 128)—then the corresponding Message ID is also added to the BMC_MessagesToBeReceivedList (block 124), notwithstanding the fact that the message has been previously received. If, in the New Message Bitmap IE, a bit corresponding to the CTCH Index of an old message is set as new, this means the old message was not transmitted in the CBS schedule period prior to the current one (in which the CBS schedule message is received and processed). There is a chance that the UE could have missed this message in an earlier transmission when the message was marked with MDT:1 (indicating a new message). To ensure that no CBS message is lost, such messages which are marked in the New Message Bitmap IE are also marked for reception in the next CBS schedule period.

If the message is included in the BMC_ReceivedMessageList (block 122) (that is, the UE has previously received this CBS message), and the New Message Bitmap IE of the CBS schedule message does not indicate that the corresponding CTCH BS Index is new (block 128)—but the corresponding Message ID is listed in the BMC_MessagesToBeReceivedList (block 128), then the message remains in the BMC_MessagesToBeReceivedList (block 124), and will be received in the succeeding CBS schedule period. This situation could occur due to multiple updates for the same message ID. For example, assume a CBS message was received in an earlier CBS schedule period (SP1), and stored in the BMC_ReceivedMessageList. Later an updated CBS message—having the same message ID—is scheduled for transmission, and the scheduling information for this transmission is included in a CBS schedule in the CBS schedule period (SP2). The MDT value is 1, indicating a new message, so the message ID is stored in the BMC_MessagesToBeReceivedList (block 114). Note that this updated CBS message should be received in the succeeding CBS schedule period (SP3). If, for some reason, the UE missed reception of the CBS message in SP3, then in the next schedule period (SP4), the CBS schedule message will again schedule it, marked with MDT:5 (old). Accordingly, it will be processed as old (block 120) and in the BMC_ReceivedMessageList (block 122). However, since the message ID appears in the BMC_MessagesToBeReceivedList (block 128), as it was never actually received, it remains in that list (block 124), and will be received in SP5.

This process repeats until all old or repetition of old CBS messages have been processed (block 130). This iterative process ensures that the UE will, during the succeeding CBS schedule period, receive only the old CBS messages that are required to ensure full exposure to the BMC broadcasts/multicasts, and further that the UE will not waste limited battery power receiving old or repetition of old CBS messages which it has previously received. Embodiments of the present invention achieve this result without regard to whether the network implements CR 0028 to 3GPP TS 25.324 by broadcasting Serial Numbers in the CBS schedule message.

CBS messages may be segmented. That is, a CBS message can be divided into multiple segments, each of which can be received in different CTCH blocks in the same schedule period. A CBS message, either wholly or partly, is received at the RLC layer 14, which is responsible for concatenating segments of a CBS message into one complete CBS message according to the RLC layer protocol mentioned in 3GPP TS 25.322. The RLC layer 14 then sends one complete CBS message to the BMC layer 12 for further processing. Each CTCH BS index specified in the Schedule Message may correspond to either a complete or part of a CBS message. To correctly handle segmented CBS messages in the BMC_MessagesToBeReceivedList, the BMC layer 12 receives assistance from lower layers—such as the RLC layer 14 and/or PHY layer 16—to determine the number of segments of the CBS message. For example, the BMC layer 12 may receive System Frame Numbers (SFN) from the RLC layer 14, or a count of the number RLC PDUs allocated to one CBS message, in order to determine whether a CBS message is segmented, and to handle it properly if so.

When all CBS messages for the succeeding period, as determined from the Message Description IE and New Message Bitmap IE of a current-period CBS schedule message, have been processed and the BMC_MessagesToBeReceivedList is populated, the BMC layer 12 configures the PHY layer 16 to receive the CBS message in the BMC_MessagesToBeReceivedList, as well as the CBS schedule message, for the succeeding period.

In the succeeding CBS schedule period, upon receiving a (complete or partial) CBS message, the BMC layer 14 removes the corresponding entry, and any repetitions thereof, from the BMC_MessagesToBeReceivedList, and adds the message ID of the CBS message to the BMC_ReceivedMessageList, If the reception of the Schedule message in one or more succeeding CBS schedule periods is missed, then the BMC layer 14 ensures that all the CBS messages received previously are received once again, since BMC layer 14 does not know how many CBS messages have changed during the missed CBS schedule periods. This is ensured by copying the contents of the BMC_ReceivedMessageList to the BMC_MessagesToBeReceivedList, while processing the next Schedule Message received at the BMC layer 14.

Figure 4:
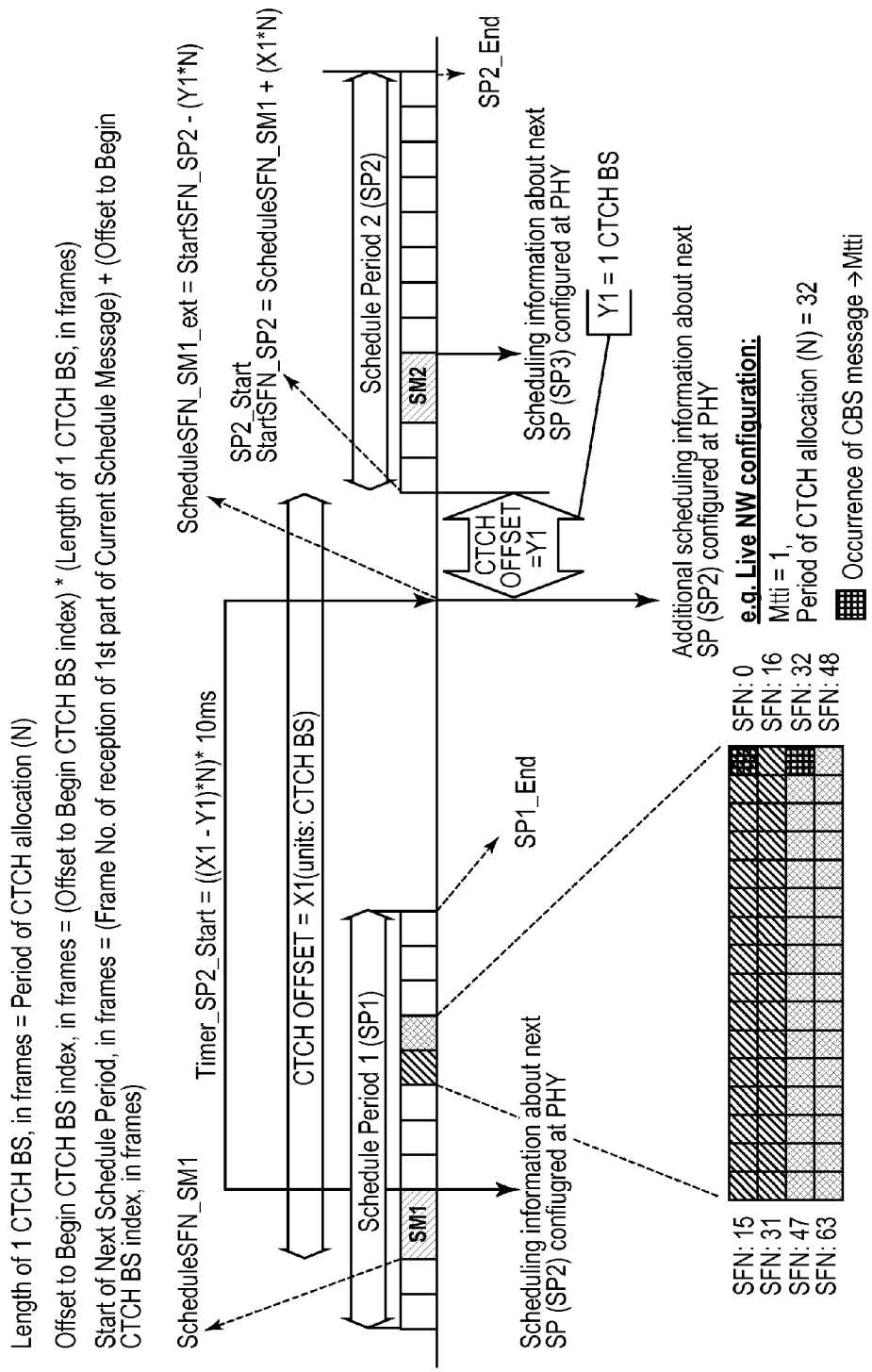
FIG. 4 is a diagram of CBS schedule periods.

A CBS schedule message may be transmitted in any position (CTCH BS) in a CBS schedule period—at or toward the beginning, in the middle, or at or toward the end. According to one embodiment, in lieu of, or in addition to, configuring the PHY layer 16 as soon as the CBS schedule message is parsed and analysed and the BMC_MessagesToBeReceivedList is populated, the BMC layer 12 configures the PHY layer 16 for CBS message reception for the succeeding CBS schedule period at the end of, or after, the current CBS schedule period. In this embodiment, the BMC layer 12 has the updated status of all CBS messages received in the current CBS schedule period, and hence is assured of the most accurate information. This timing is depicted in FIG. 4. FIG. 4 also depicts various equations used to calculate the relevant timing offsets and timing of the PHY layer configuration(s).

FIG. 5 depicts a UE 30 operative in embodiments of the present invention. The UE 30 includes a user interface 32 (display, touchscreen, keyboard or keypad, microphone, speaker, and the like); a processor 34; memory 36; and a radio circuitry, such as one or more transceivers 38, antennas 40, and the like, to effect wireless communication across an air interface to one or more base stations in a wireless communication network. The UE 30 may additionally include features such as a camera, removable memory interface, short-range communication interface (Wi-Fi, Bluetooth, and the like), wired interface (USB), and the like (not shown in FIG. 7). According to embodiments of the present invention, the memory 36 is operative to store, and the processor 34 operative to execute, software 42 which when executed is operative to implement a BMC layer 12 operative to implement the methods and functions described herein The processor 34 may comprise any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 36 may comprise any non-transient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The radio circuitry may comprise one or more transceivers 38 used to communicate with one or more network nodes via a Radio Access Network according to one or more communication protocols known in the art or that may be developed, such as IEEE 802.xx, CDMA, WCDMA, GSM, LTE, UTRAN, WiMax, or the like. The transceiver 38 implements transmitter and receiver functionality appropriate to the Radio Access Network links (e.g., frequency allocations and the like). The transmitter and receiver functions may share circuit components and/or software, or alternatively may be implemented separately.

Embodiments of the present invention present numerous advantages over the prior art. In particular, a UE receives all necessary and relevant CBS messages, while avoiding wasting battery power to receive unnecessary CBS messages, in networks that do not transmit CBS message Serial Number information in the CBS message. This power efficient solution is advantageous in existing uses of the BMC protocol, such as commercial services; however, it may find particular utility as the use of CBS expands for emergency services, such as the Commercial Mobile Alert System (CMAS) and Earthquake and Tsunami Warning Service (ETWS).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of efficiently receiving Broadcast/Multicast Control (BMC) protocol messages by a BMC layer in User Equipment operative in a wireless communication network, comprising:

maintaining a first list comprising Message IDs of Cell Broadcast Service (CBS) messages to be received during a succeeding CBS schedule period;

maintaining a second list comprising Message IDs of received CBS messages;

receiving a CBS schedule message;

determining, from the CBS schedule message, all CBS messages scheduled to be broadcast in the succeeding CBS schedule period;

adding to the first list, all scheduled CBS messages indicated in the CBS schedule message as new or repetition of new;

adding to the first list, all scheduled CBS messages indicated as old or repetition of old that are not included in the second list;

adding to the first list, all scheduled CBS messages indicated as old or repetition of old that are included in the second list and for which the corresponding Common Traffic Channel (CTCH) block set (BS) Index in the CBS schedule message is indicted as new in a New Message Bitmap information element (IE); and configuring resources to receive only the CBS messages in the first list, as well as a CBS schedule message, in the succeeding CBS schedule period.

2. The method of claim 1 further comprising, in the succeeding CBS schedule period, for each CBS message in the first list:

receiving and processing the CBS message;

adding the corresponding Message ID to the second list; and removing the corresponding Message ID, as well as any replications, from the first list.

3. The method of claim 1 wherein configuring resources to receive the CBS messages in the first list comprises configuring the resources upon updating all relevant Message IDs to the first list.

4. The method of claim 1 wherein configuring resources to receive the CBS messages in the first list comprises configuring the resources at or following the end of the current CBS schedule period.

5. The method of claim 1 wherein configuring resources comprises configuring a physical layer in a network protocol stack.

6. The method of claim 1 wherein determining the CBS messages scheduled to be broadcast in the succeeding CBS schedule period includes determining which of the scheduled CBS messages are segmented across two or more CBS scheduling periods.

7. The method of claim 6 further comprising:
receiving logical or physical data unit sequence numbers associated with a segmented CBS message;
assembling a completed CBS message from segmented CBS messages received during two or more CBS scheduling periods; and
passing the complete CBS message to a higher layer.

8. User Equipment (UE) operative in a wireless communication network, comprising:
a transceiver operative to selectively receive messages from a network node;
memory; and
a processor operatively connected to the memory and operative to
maintain a first list comprising Message IDs of Cell Broadcast Service (CBS) messages to be received during a succeeding CBS schedule period;
maintain a second list comprising Message IDs of received CBS messages;
cause the transceiver to receive a CBS schedule message;
determine, from the CBS schedule message, all CBS messages scheduled to be broadcast in the succeeding CBS schedule period;
add to the first list, all scheduled CBS messages indicated in the CBS schedule message as new or repetition of new;
add to the first list, all scheduled CBS messages indicated as old or repetition of old that are not included in the second list;
add to the first list, all scheduled CBS messages indicated as old or repetition of old that are included in the second list and for which the corresponding Common Traffic Channel (CTCH) block set (BS) Index in the CBS schedule message is indicted as new in a New Message Bitmap information element (IE); and
configure resources to receive only the CBS messages in the first list, as well as a CBS schedule message, in the succeeding CBS schedule period.

9. The UE of claim 8 wherein the processor is further operative to, in the succeeding CBS schedule period, for each CBS message in the first list:
cause the transceiver to receive the CBS message;
process the CBS message;
add the corresponding Message ID to the second list; and
remove the corresponding Message ID, as well as any replications, from the first list.

10. The UE of claim 8 wherein the processor is operative to configure resources to receive the CBS messages in the first list by configuring the resources upon updating all relevant Message IDs to the first list.

11. The UE of claim 8 wherein the processor is operative to configure resources to receive the CBS messages in the first list by configuring the resources at or following the end of the current CBS schedule period.

12. The UE of claim 8 wherein the processor is operative to configure resources by configuring a physical layer in a network protocol stack.

13. The UE of claim 8 wherein the processor is operative to determine the CBS messages scheduled to be broadcast in the succeeding CBS schedule period by also determining which of the scheduled CBS messages are segmented across two or more CBS scheduling periods.

14. The UE of claim 13 wherein the processor is operative to:
receive logical or physical data unit sequence numbers associated with a segmented CBS message;
assemble a complete CBS message from segmented CBS messages received during two or more CBS scheduling periods; and
pass the complete CBS message to a higher layer.

\* \* \* \* \*